(12) United States Patent
Burges

(10) Patent No.: US 7,672,939 B2
(45) Date of Patent: *Mar. 2, 2010

(54) SYSTEM AND METHOD PROVIDING AUTOMATED MARGIN TREE ANALYSIS AND PROCESSING OF SAMPLED DATA

(75) Inventor: Christopher J. C. Burges, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 250 days.

This patent is subject to a terminal disclaimer.

(21) Appl. No.: 11/462,932

(22) Filed: Aug. 7, 2006

(65) Prior Publication Data

US 2006/0271512 A1 Nov. 30, 2006

Related U.S. Application Data

(63) Continuation of application No. 11/086,831, filed on Mar. 22, 2005, now Pat. No. 7,089,254, which is a continuation of application No. 10/179,049, filed on Jun. 25, 2002, now Pat. No. 6,931,413.

(51) Int. Cl.
*G06F 7/00* (2006.01)
*G06F 17/30* (2006.01)

(52) U.S. Cl. ................. 707/5; 707/3; 707/101
(58) Field of Classification Search ........... 707/100, 707/101, 104.1, 10
See application file for complete search history.

(56) References Cited

U.S. PATENT DOCUMENTS

| | | | | |
|---|---|---|---|---|
| 4,493,980 A * | 1/1985 | Payne et al. | ............ | 219/448.12 |
| 4,797,941 A * | 1/1989 | Lloyd et al. | ............ | 382/205 |
| 5,121,493 A * | 6/1992 | Ferguson | ............ | 707/7 |
| 5,168,275 A * | 12/1992 | Harrison et al. | ............ | 341/71 |
| 5,216,750 A | 6/1993 | Smith | | |
| 5,682,404 A * | 10/1997 | Miller | ............ | 375/222 |
| 5,706,495 A | 1/1998 | Chadha et al. | | |
| 5,715,442 A * | 2/1998 | Ishida et al. | ............ | 707/1 |
| 5,734,791 A * | 3/1998 | Acero et al. | ............ | 704/222 |
| 5,930,149 A * | 7/1999 | Takahashi | ............ | 716/2 |
| 5,987,446 A * | 11/1999 | Corey et al. | ............ | 707/3 |
| 6,047,283 A * | 4/2000 | Braun | ............ | 707/3 |
| 6,456,599 B1 * | 9/2002 | Elliott | ............ | 370/254 |
| 6,581,072 B1 * | 6/2003 | Mathur et al. | ............ | 707/104.1 |
| 2002/0026253 A1 * | 2/2002 | Rajan | ............ | 700/94 |
| 2003/0004938 A1 * | 1/2003 | Lawder | ............ | 707/3 |

* cited by examiner

*Primary Examiner*—James Trujillo
*Assistant Examiner*—Marc Somers
(74) *Attorney, Agent, or Firm*—Lee & Hayes, PLLC

(57) ABSTRACT

The present invention relates to a system and methodology to facilitate database processing in accordance with a plurality of various applications. In one aspect, a large database of objects is processed, wherein the objects can be represented as points in a vector space, and two or more objects are deemed 'close' if a Euclidean distance between the points is small. This can apply for substantially any type of object, provided a suitable distance measure can be defined. In another aspect, a 'test' object having a vector x, is processed to determine if there exists an object y in the database such that the distance between x and y falls below a threshold t. If several objects in the database satisfy this criteria, a list of objects can be returned, together with their corresponding distances. If no objects were to satisfy the criterion, an indication of this condition can also be provided, but in addition, the condition or information relating to the condition can be provided.

13 Claims, 11 Drawing Sheets

SYSTEM AND METHOD PROVIDING AUTOMATED MARGIN TREE ANALYSIS AND PROCESSING OF SAMPLED DATA

CROSS-REFERENCE TO RELATED APPLICATIONS

This application is a continuation application of U.S. patent application Ser. No. 11/086,831, entitled "SYSTEM AND METHOD PROVIDING AUTOMATED MARGIN TREE ANALYSIS AND PROCESSING OF SAMPLED DATA," filed on Mar. 22, 2005, which is a continuation of U.S. patent application Ser. No. 10/179,049 filed on Jun. 25, 2002 (now issued as U.S. Pat. No. 6,931,413, issued Aug. 16, 2005). The entireties of the aforementioned applications are incorporated herein by reference.

TECHNICAL FIELD

The present invention relates generally to computer systems, and more particularly to a system and method to automatically analyze and process sampled data formatted as a one or more vectors of potentially noisy samples, wherein the vectors are quantized and processed in accordance with various user-settable thresholds, controls and parameters, in order to facilitate robust and efficient lookup of previously stored data relating to the samples.

BACKGROUND OF THE INVENTION

Signal processing architectures are one of the main foundational components of the modem digital age. As is common in ordinary desktop or mobile computer applications, users are given a plurality of multimedia choices when viewing, listening, and/or interacting with data that has been processed by such systems. Before users actually utilize such data in a respective application, however, analog information is typically sampled and captured in real time via an analog-to-digital converter and processed via a Fast Fourier Transform (FFT) and/or other signal processing techniques. Sampled data is often stored in a database whereby subsequent signal processing and/or data manipulation is performed thereon. After the data has been stored, a plurality of database algorithms or techniques may be employed to retrieve such data and are described below. Unfortunately, the form of data storage such as via a floating-point format is not very conducive to efficient processing and retrieval of the data. Moreover, noise that may be present in any given sample of data may cause significant problems when determining if another previously stored and/or related sample can be located in the database. For example, if a recently captured data sample were sent to a database of stored samples that are potentially related to the captured data, and the recently captured data was taken in a noisy environment, it may be substantially difficult (or not possible) to determine if the noisy sample matches or relates to any of the previously stored samples in the database (e.g., require large amounts of processing bandwidth to determine a match, if any).

As noted above, many database techniques have evolved to locate and retrieve previously stored data such as can be provided by various tree lookup procedures. For example, there are many variants of tree lookup processes that attempt to speed-up basic nearest neighbor determinations. One of the earliest known is the k-d tree, which is a binary tree wherein the data is split, according to the value of a particular component, such that roughly half of the data falls on either side of the split, whereby the particular component is selected to maximize the variance of the data in a direction perpendicular to a corresponding hyperplane. In a test phase, a rectangle containing a test point is located by descending the tree, wherein backtracking (e.g., process of retracing a search path) is performed if the closest training point in an associated hyperectangle is such that points in adjacent rectangles may be closer. It is believed that k-d trees are somewhat limited to applications having lower dimensional structures (e.g., about 10 dimensions). In addition, the k-d tree has the property that rejection (of a point that falls farther than a threshold away from all other points in the database) can be as computationally expensive as finding the nearest neighbor.

More recently, a variety of trees—an R-tree, an R* variant, and for example S-S trees have been proposed. In these trees, processed nodes correspond to regions in space into which the data falls, so if a test point falls in a node, the other points in that node are known or assumed to be close to the test point. However, this does not obviate the need for backtracking, but facilitates making an early rejection possible—a property that k-d trees do not have. In R-trees, the nodes are populated by rectangles. R-trees are a variant that tend to minimize the area, margin and overlap of the rectangles (whereby the 'margin' of a rectangle may be defined as the sum of the lengths its sides), which generally results in faster lookup, and also introduces 'forced reinsertion', for providing a more balanced tree.

The S-S (similarity search) tree approach may even outperform R-trees on high dimensional data. In this approach, leaves of the tree correspond to ellipsoids, in which a center and radius are defined by the data enclosed (generally, the principal axes of the ellipsoid are selected beforehand, and represent the relative importance of different dimensions). The center of the ellipsoid is thus, the centroid of the data, wherein the radius is selected to enclose the data. Again, forced reinsertion is employed to balance the tree. Other approaches have focused on how approximate matching (that is, given a query q and some set of points P, find a point $p \in P$ such that $\forall\ p' \in P$, $d(p,q)<(1+\epsilon)d(p', q)$, for some small $\epsilon$, wherein $d(p,q)$ is a distance measure between p and q) can yield more optimal bounds on preprocessing and lookup times than exact matches provide, however, the lookup time scales as $(1/\epsilon)_d$, wherein d is the dimension of the space which may cause an impractical computational expense for many applications that employ higher dimensional data sets.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate automated and efficient database lookup/matching between a test data subset and previously stored data associated with the subset. The test data subset (or test data) can be derived from a plurality of sources such as from a sampled analog signal that is digitized and processed in the form of an N-dimensional vector. The vector or vectors are then quantized into a subsequent vector form (e.g., transformed from floating point vector components to discrete vector components) in accordance with various adjustable thresholds that can be set by users to control one or more performance aspects of the present invention (e.g., computational performance, trade-off between client and server processing, accuracy, noise robustness and so forth).

In one example, the quantized values—which are employed in various lookup procedures, can be determined as a 0 value, a 1 value, and a q value, wherein q denotes a backtracking operation. The thresholds are adjusted to control the amount and/or placement of the q values in the subsequent or quantized vector (or vectors) such that further database processing can be optimized and/or mitigated—by processing the quantized vector in place of the original vector or test data subset. Other aspects of the present invention include processes that compensate for noisy data conditions, mitigate the amount of data transmissions between database systems, mitigate database computational complexities, and/or balance lookup or retrieval performance between database systems when performing lookups of data that may be associated with the test data.

The lookup processes provided by the present invention can be employed in a plurality of applications. For example, in one application, a test audio sample, which may be sampled in a noisy environment, is digitized and quantized in accordance with the present invention, the quantized data is then employed to determine if a corresponding match to the audio sample is found in the database. If so, such information as the title of a song or an identity of a speaker may be retrieved from the database and provided to the system and/or user that generated such sample. Other applications can include verification or checking that services have actually been performed and/or include infringement analysis of products or works (e.g., verify that paid advertising is delivered as promised, determine if other sources are copying a copyrighted product).

Various advantages are provided by the signal and/or database systems and processes of the present invention. In one aspect, systems can quickly reject query data that is not in a database, generally without having access to the full database. Thus, for server-client systems, whereby the client performs as much rejection as possible before sending matching candidates or requests to the server for a full lookup, the full database will likely be too large to be acceptable to most clients (e.g., for 32 floats per audio sample or vector, 10 vectors per audio clip, and a million related items such as songs to lookup, the database would need about 1.28 GB). In another aspect, processing between the client and server can be optimized. For example, formats and controls can be provided to take advantage of processing resources on the client in order that the server does not have to redo computations that were previously performed on the client. In another aspect, users can control the tradeoff between computational complexity and accuracy. For example, on installation of software adapted in accordance with the present invention, users can select (or the installing software selects), based on the speed of the machine, how much computation the machine will need to identify a given item, and trade off accuracy (e.g., false negative rate) to achieve that balance (e.g., by changing the level of backtracking via threshold controls).

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate database processing in accordance with a plurality of various applications. In one aspect, a large database of objects is processed, wherein the objects can be represented as points in a vector space, and two or more objects are deemed 'close' if a Euclidean distance between the points is small. However, this can apply for substantially any type of object, provided a suitable distance measure can be defined. In another aspect, a 'test' object having a vector x (bold font denotes vectors), is processed to determine if there exists an object y in the database such that the distance between x and y falls below a threshold t. If several objects in the database satisfy this criteria, a list of objects can be returned, together with their corresponding distances. If no objects were to satisfy the criterion, an indication of this condition can also be provided, but in addition, the condition or information relating to the condition can be provided in a rapid manner—in other words, 'pruning' is also a consideration.

The present invention can be applied to a plurality of applications whereby various objects that are to be "looked up" are likely not to be found in the database currently being processed. In one instance, an audio sample (or other type data) can be generated, for example, wherein a 'trace fingerprint' vector is computed from an audio stream at predetermined intervals, wherein a respective audio clip of vectors may encompass a single fingerprint (e.g., computed from five seconds into the audio) in the database. In this case, most of the traces to be looked-up may not be in the database (e.g., the traces may be from a different part of the clip, or from some audio that is not in the database). As will be described in more detail below, audio fingerprinting and/or other type of signal processing applications are provided that are derived in some form from a vector-based generation process. In many cases, a "match" to the associated vector may not be exact since a respective test sample may be generated from a noisy version of the sample residing in the database. For purposes of discussion, it can be assumed that respective components of the vectors y lie in the range [−1, 1] (other ranges possible), and that the vectors have d components, d being an integer.

Figure 1:
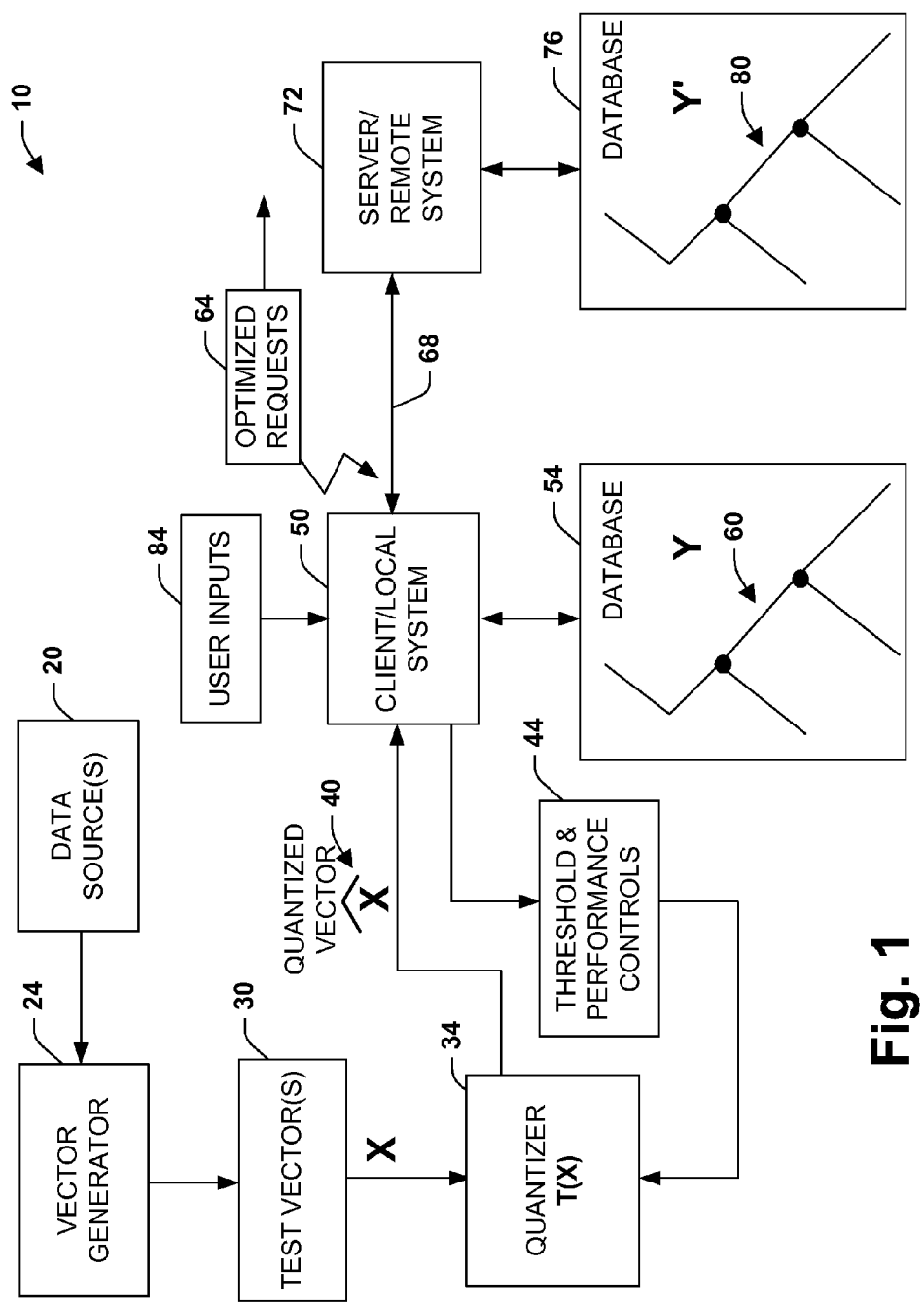
FIG. 1 is a schematic block diagram illustrating a data processing architecture in a distributed computing environment in accordance with an aspect of the present invention.

Referring initially to FIG. 1, a system 10 illustrates a data and signal processing architecture in a distributed computing environment in accordance with an aspect of the present invention. One or more data sources 20 are sampled and processed by a vector generator 24. The data sources 20 can be from substantially any source such as an audio, video and/or signal source such as a voltage or current generator. Alternatively, the data sources 20 can represent digitized data, whereby the vector generator 24 would pass-thru the digitized data to a subsequent processing stage without further signal processing (or with minimal signal processing), or the data sources 20 can be adapted to bypass the vector generator 20 to a subsequent processing stage described herein. The vector generator 24 includes such aspects as an analog to digital converter (A/D) and can provide various processing aspects (e.g., FFT, Z transform, digital filtering, windowing, equalization) to produce/compute one or more test vectors 30 that are representative of the source 20 and denoted by a bold x. It is noted that x can be in the form of an N-dimensional vector, N being an integer, such as for example:

$$x=[0.2, -0.03, -0.22, 0.53, \ldots N_{th} \text{ vector component}]$$

wherein the components of x are generally positive and negative floating point values (can also be non-floating point— e.g., rounded values) stored in a single-dimension array.

A quantizer 34 processes the test vectors 30 to produce a quantized version or format of x which is denoted as $\hat{x}$ at reference numeral 40 in accordance with a threshold function $T(x)$, wherein $\hat{x}$ is an M-dimensional vector, M being an integer, having respective vector component values of 0, 1, and q as in the following example:

$$\hat{x}=[011q0q10000q101 \ldots M_{th} \text{ vector component}]$$

wherein q denotes backtracking.

As will be described in more detail below, the threshold function $T(x)$ and/or other parameters can be controlled or adjusted via one or more threshold and performance controls 44 to limit/adjust the number of q (or other factors) in the quantized vector and/or to control q placement within the quantized vector 40 (e.g., adjust threshold parameters/levels in $T(x)$). Typically, the function $T(x)$ will take into account the statistics of the data, so that each component of x is translated and resealed so that it has zero mean and unit variance, before the quantization is applied. In this manner, and other considerations described below, the controls 44 mitigate database processing, facilitate robust storage and retrieval of data in view of potential noise considerations at the source 20, and/or facilitate load balancing considerations between local and remote database systems (e.g., by limiting, dynamically adjusting, and/or controlling number of q).

The controls 44 can be provided from a client/local system 50 that processes a database 54 in accordance with a lookup tree 60, wherein the quantized vector 40 is employed to navigate through the tree to determine if the test vector 30, in its quantized form at reference numeral 40, matches portions of the database 60 that stores vectors denoted as y and y'. For example, if the quantized vector 40 such as: $\hat{x}=[01q0]$ was encountered, a left edge traversal, followed by a right edge traversal would be performed. The following node would be marked for backtracking; each side of the tree underneath that node would subsequently be traversed. However in both such traversals, only the left edge attached to the node underneath that node marked 'q' would be traversed. In this manner, the tree 60 would be evaluated to determine if a match existed for the test vector 30 having been quantized as [01q0] (note: left and right is arbitrary, can be reversed in accordance with opposite storage direction/procedure). If a match is found by the client system 50 in the database 54, an optimized request 64 is transmitted via a network 68 to a server/remote system 72, wherein searching continues in a database 76 via a lookup tree 80. As will be described in more detail below, the optimized requests 64 (e.g., request to have server perform lookup) are tailored and/or dynamically crafted to mitigate database processing by the server 72, such that processing already performed by the client is not duplicated by the server.

It is noted that the terms client and server, as used herein, are not meant to limit the present invention to a particular configuration. For example, the client system 50 can be configured as a server in some or all aspects and the server system 72 can be configured having one or more client aspects. It is also noted that the client database 54 may contain only quantized data $\hat{x}$, in tree form, together with index data indicating which vectors in the database occur at which leaf nodes, but that in other instantiations, may also contain the vector data y. The server database 76 will contain the quantized data $\hat{x}$ and the vector data y. Furthermore, one or more user inputs 84 can be provided to the client system 50 to facilitate user adjustments of the threshold and performance controls at 44 (e.g., from a Graphical User Interface, or from an installation wizard). As noted above, the client system 50, upon power-up, at predetermined intervals, and/or at direction of a user can automatically and/or dynamically adjust the threshold and performance controls 44 in accordance with determined operating performance of the client and/or desires of the user. For example, upon installation, the thresholding function can be chosen to suit the CPU capability of the client machine, so that faster machines can perform more backtracking locally, before sending queries on to the server. As another example, if the server system 72 is heavily loaded, and it is determined that the client system 50 is operating at 20% processing capacity, the threshold and performance controls 44 can be adjusted to shift more database processing from the server system to the client system.

FIGS. 1 through 7 illustrate systems and associated methodologies to facilitate database and signal processing in accordance with the present invention. While, for purposes of simplicity of explanation, the methodologies may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 2:
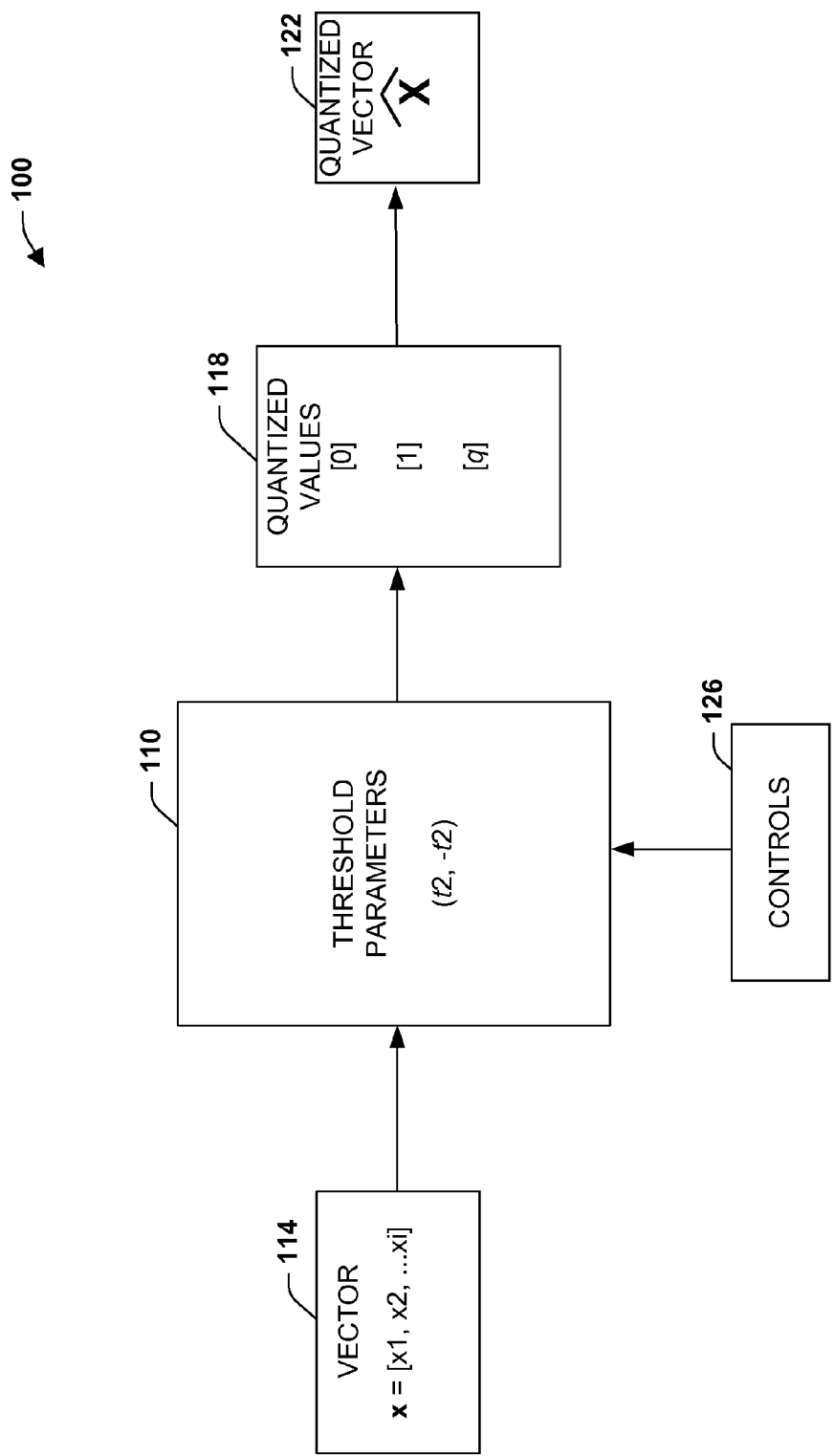
FIG. 2 is diagram illustrating a quantization process in accordance with an aspect of the present invention.

Referring now to FIG. 2, a diagram 100 illustrates a quantization process in accordance with an aspect of the present invention. A threshold processor 110 having threshold parameters $t_2$ and $-t_2$ receives a vector x from 114, determines quantized values at 118, to produce a quantized vector $\hat{x}$ at 122. In one aspect, components of x denoted as d are tested against threshold parameters $t_2$ and $-t_2$ to determine quantized values 118 that form the components of binary vectors such as x̂ at 122 that are then employed to perform lookup via binary trees, for example. During processing at 110, several aspects are considered as follows:

The components of x are first shifted and rescaled, so that over a suitable training set, each component has zero mean and unit variance.

Quantization Noise: If each component of x is merely thresholded, so that (e.g., $x_i>0$ maps to 1 and $x_i \leq 0$ maps to 0), then very small changes in the original vector x (if some of its components are close to zero) can result in a different binarized version. Instead, the following process can be employed:

Each component of a given d-component x is applied to a threshold or tested, via a threshold function T(x), into one of three values. For a given component $x_i$, if $x_i \geq t_2$ then $T(x_i)=1$, if $x_i < -t_2$ then $T(x_i)=0$, and if $-t_2 \leq x_i < t_2$ then $T(x_i)=q$, wherein q is a third symbol denoting 'backtrack.' A q is a placeholder to flag where backtracking is required by the lookup system. In one aspect, quantizing in this manner makes it less likely for errors to occur (e.g., a component that is in the database as a 1, but appears in the quantized test vector as a 0, must have changed by at least $2t_2$, which is unlikely—although other noise compensation processes are described below). The quantized version of x is denoted as "x̂" at 122. In general, database lookup is achieved with a binary tree (or other type tree), that is, if for example, the vector [10110] is given, the tree (traversing, for example, left for 0, right for 1) until either a needed edge does not exist (which implies that the object is not in the database) or a leaf containing a list of objects is encountered (implying that the string [10110] corresponds to one of the objects in the leaf).

If a given component $x_i$ falls in the range $[-t_2, t_2]$, then it maps to symbol q at 118, and when evaluating x̂, when the symbol q is encountered, both corresponding branches of the tree are then explored—this is referred to as 'backtracking', since systems only need explore the second branch if the first one does not result in a leaf. Thus, in order to limit computational cost (e.g., number of iterations applied to database during a search), the number of q's should be controlled as is described in more detail below. As illustrated, one or more controls can be provided at 126 to adjust the threshold parameters or other aspects (e.g., adjust values of $t_2$, $-t_2$). It is noted that the computational cost of backtracking generally depends both on the number of q's, and on where they appear in the tree, but limiting the number of q's may not limit the worst case cost.

Generally, a given leaf in the tree can correspond to several database entries. If a given incoming signal maps to such a leaf, then each such entry will have to be compared against the incoming signal. However this is much cheaper than having to compare against the whole database. It may also happen that in some cases, noisy data, whose clean version is in the database, maps to a leaf which does not contain the label of that data. However in this case, the server can simply check against the whole database. Thus the approximate lookup is reducing computational load in at least two ways: First, if no leaf is reached, the item can be rejected as not being in the database, and second, if a leaf is reached, then often, just checking the data which resides at that leaf will be sufficient to identify the data.

Figure 3:
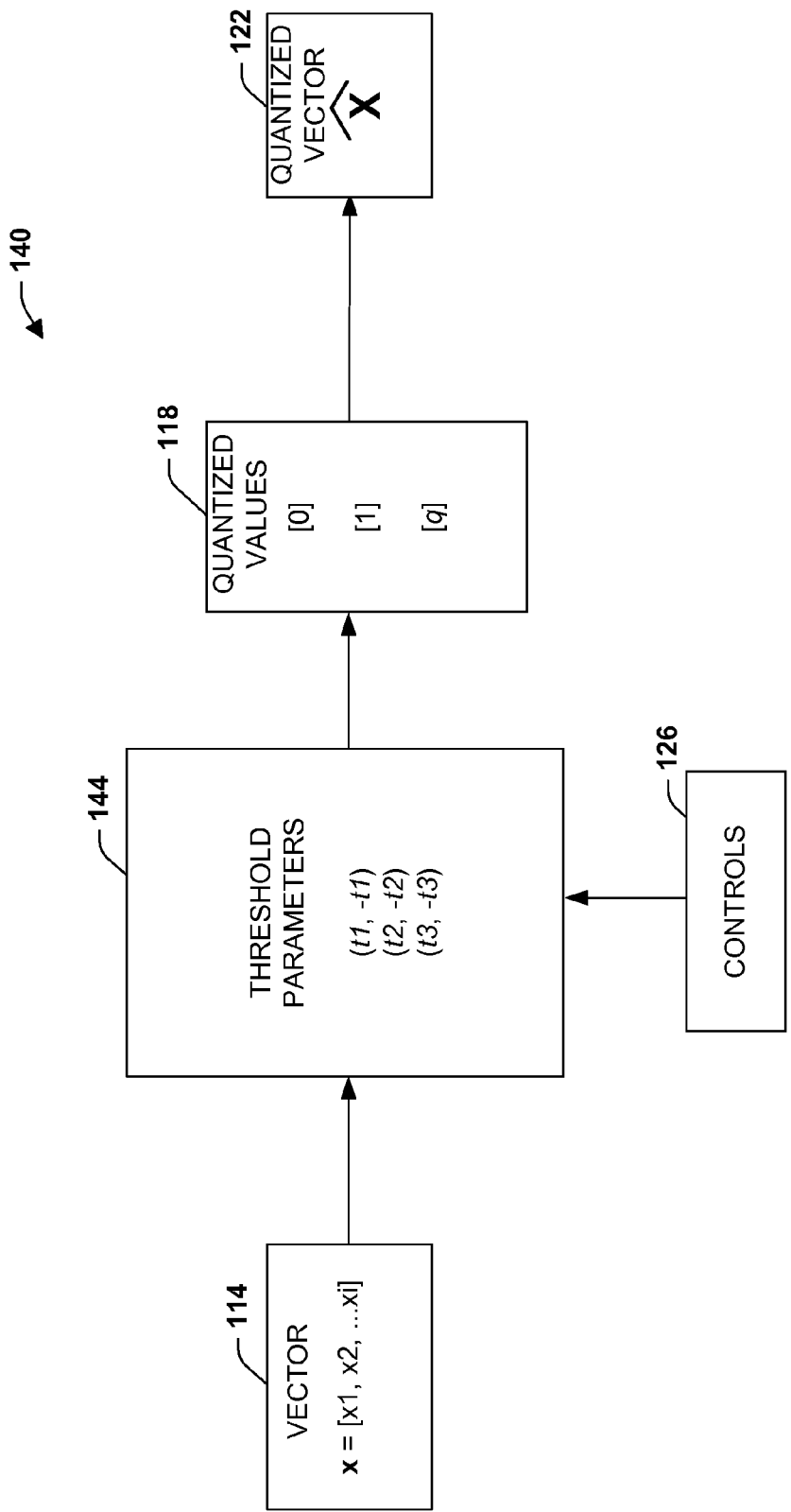
FIG. 3 is a diagram illustrating a backtracking control process in accordance with an aspect of the present invention.

FIG. 3 is a diagram illustrating a backtracking control process 140 in accordance with an aspect of the present invention. In this aspect, a threshold processor 144 introduces additional threshold parameters $t_1$, $-t_1$, and $t_3$, $-t_3$ to control backtracking complexity as follows: Assume that a user desires to allow a maximum of n backtrack symbols q for any given test point. To this end, two additional thresholds, $t_1$ and $t_3$, with $t_1 < t_3$ are introduced at 144. For a given point x, if the number of components $x_i$ for which $-t_1 < x_i < t_1$ is greater than or equal to n, then that point is rejected (note: this may lead to some false negatives). If possible, find a value for $t_2$ such that $t_1 < t_2 < t_3$ and such that, for n values of i, $-t_2 < x_i < t_2$ is established. Then, map those $x_i$ to q, so that n locations in the test vector require backtracking. If this is not possible, select $t_2 = t_3$, and compute the components that require backtracking as above. This latter case results in fewer than n backtracking symbols, and therefore is less costly to compute. For example, if all $x_i$ satisfy $|x_i| > t_3$, then n=0, and no backtracking is necessary for that vector. In this manner, the number of backtrack symbols is limited to be at most n, and the computational cost of backtracking is thus also bounded.

Figure 4:
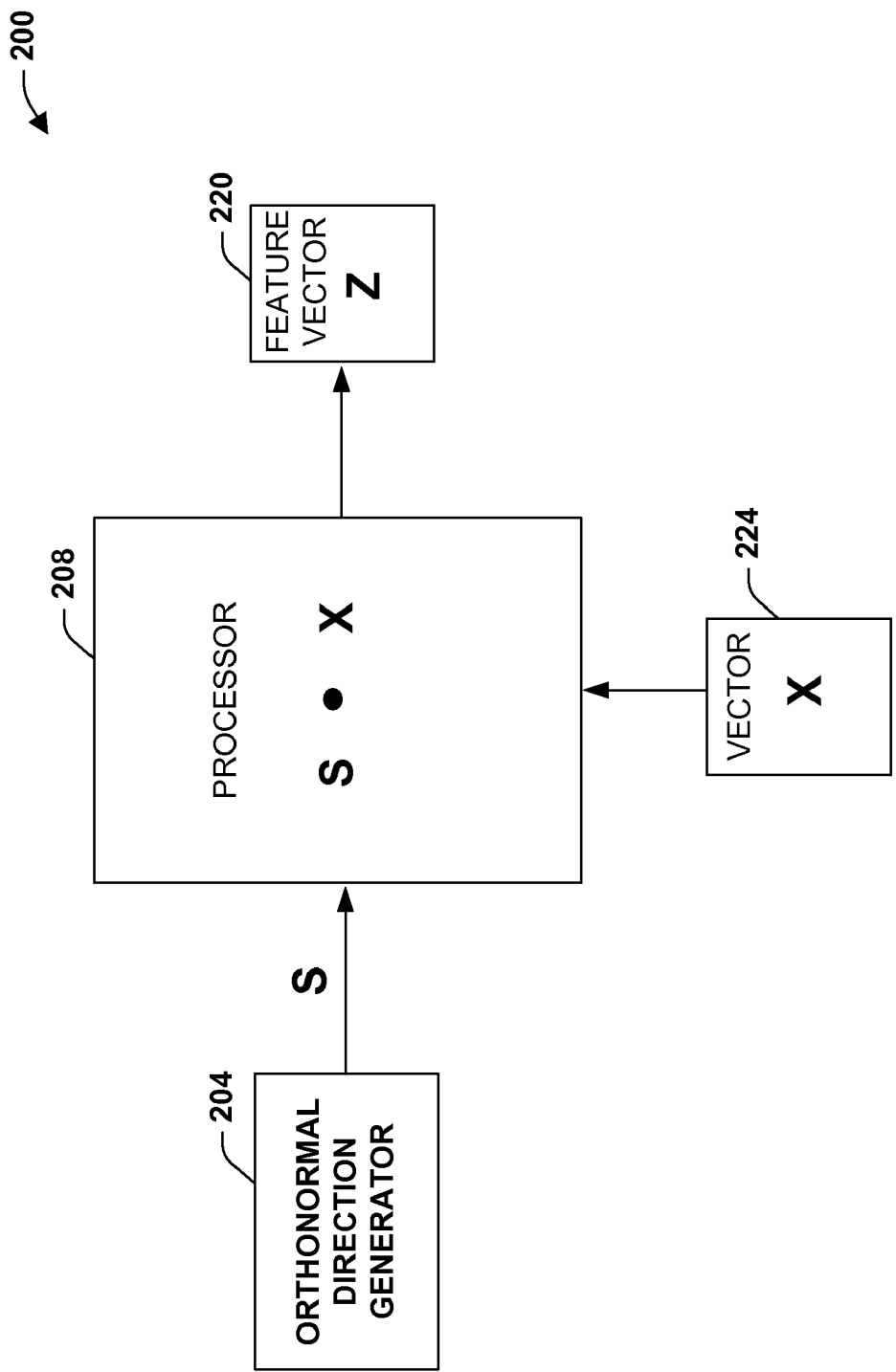
FIG. 4 is a diagram illustrating a noise control process in accordance with an aspect of the present invention.

FIG. 4 is a diagram 200 illustrating a noise control process in accordance with an aspect of the present invention. In the systems and processes previously described, there may be individual components in x that are more sensitive to certain types of noise than others. For example, a noisy version of a given vector x may be the same as the noise-free version in all components except one, for example, the i=3 component. This component may cross the above thresholds and produce an incorrect quantization, despite the fact that, since no other components have changed, the Euclidean distance between x and y may still be very small (or at least, below the threshold set to decide on 'sameness').

Instead of using x directly, a set of N random orthonormal direction vectors are generated at 204. A first direction $s_1$ has random components which are then normalized so that $||s_1||=1$. A second direction S2 is initially chosen with random components, but its projection along $s_1$ is subtracted, and the vector is then normed. The process proceeds, using this Gram-Schmidt procedure to generate N directions which are both random and orthonormal in nature. A processor at 208 then generates a new feature vector at 220 whose j'th component is a dot product of x with $S_j$ (x is illustrated at 224). Thus, if only a few components of x change, then the projection will not change by much, and by choosing normal vectors at 204, no additional correlation is typically introduced by taking the projections. It is noted, that in principle, situations can still occur where noise introduces a large change in just a few components of the resulting feature vector 220, but that this will require 'collusion' between the original features in x and the random vectors s, which is unlikely. The derived feature vector is denoted as z at 220. It is further noted that by selecting fewer than d vectors s, the process 200 can generate fewer than d features if desired. Since the projected components are employed as features, generally, the only extra cost will occur if the projections result in many different vectors mapping to the same projected vector. A theorem by Johnson and Lindenstrauss supports this approach, since it illustrates that random mappings from higher to lower dimensional spaces can be distance-preserving, to within certain bounds. Thus, for a large enough number of random projection vectors s, the probability that two distant points map to two points that are close together can be made substantially small. It is noted that the above random averaging is not required in the present invention, but may be useful for some types of data.

A further method to reduce the computation done at the client is to reduce the size of the tree to a given depth d, by collapsing the data at all leaves below a node n at depth d into one leaf at node n. In this manner, the computational load can be shifted between client and server, depending on the resources available at the client. For a collapsed tree, only the first d bits of the quantized vector would be used for lookup.

Figure 5:
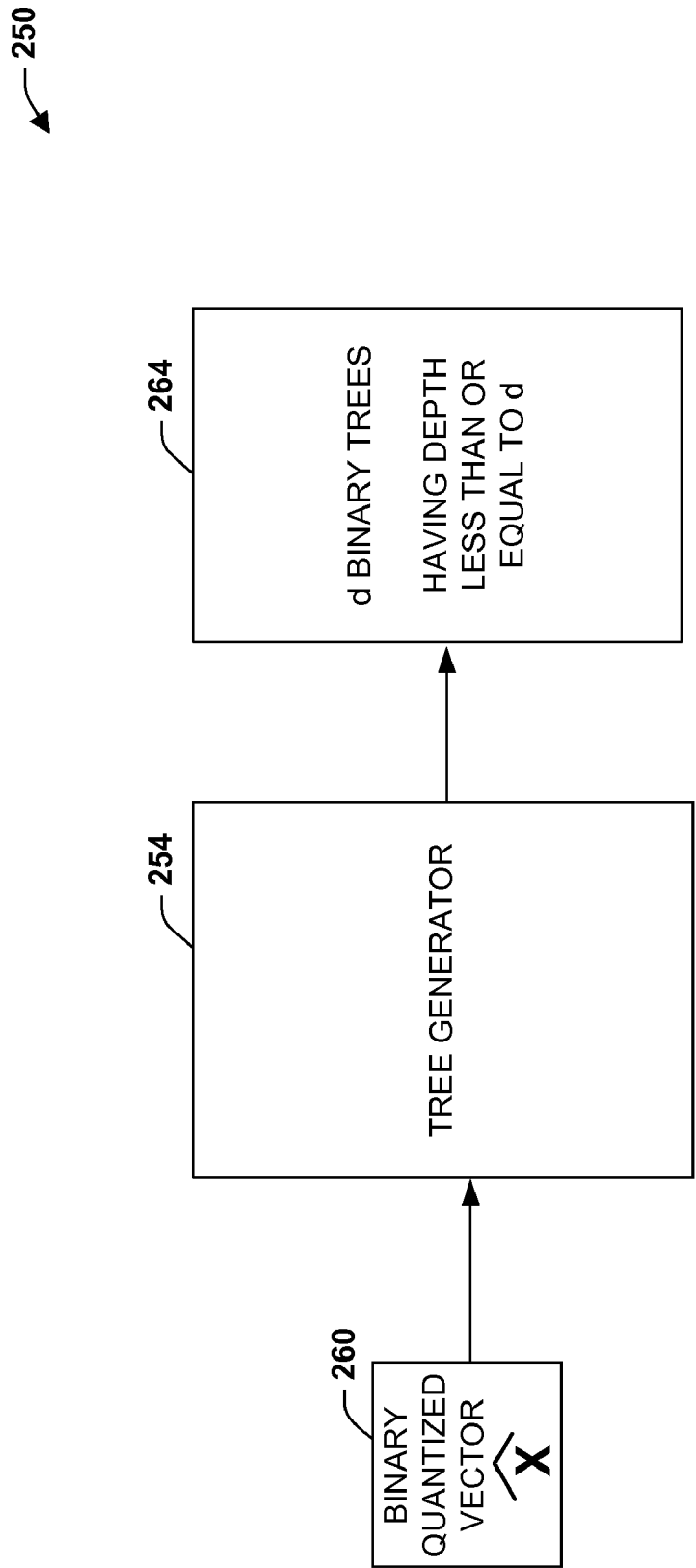
FIG. 5 is a diagram illustrating a computational control process in accordance with an aspect of the present invention.

FIG. 5 is a diagram illustrating a computational control process 250 in accordance with an aspect of the present invention. A tree generator or processor 254 is provided to process a binary vector x̂ at 260 and produce modified trees at 264 that are created to further lower computational costs of database lookups, wherein computational cost can be further lowered as follows: Instead of having one binary tree, construct d binary trees, each of depth up to d. The i'th tree is constructed by starting at position $z_i$, and then wrapping the vector, so that $z_d$ is followed by $z_1, \ldots, z_{i-1}$. Each tree generally contains the same information, but the computational cost can be reduced up front by selecting the optimal tree to lookup a given test vector z. To simplify the exposition, consider only the case where the binary trees are of full depth. Then, for example, if there is just one q symbol, then choosing the tree for which the q is at the last node will require (worst case) d+1 edges to be traversed, whereas selecting the tree for which the q is at the top node will require (worst case) 2d edges to be traversed. Assuming the worst case (that the tree is complete), an optimal tree can be computed with the following lemma:

Lemma: Given a complete binary tree T of depth d, define the i'th layer of nodes to be those nodes separated from the root node by i−1 edges, and define the i'th layer of edges to be those edges emanating from the i'th layer of nodes. Let z be a d-vector with elements in {0, 1, q}. Define $r_i=1$ if $z_i=q$, 0 otherwise. Then in order to evaluate z against T, the number of edges that are traversed is:

Equation 1:

$$\sum_{i=1}^{d} 2^{\sum_{j=1}^{i} r_j} \equiv N(z)$$

Example Proof: Define an 'active edge' to be one traversed in the tree by z, with backtracking. Consider the k'th layer of edges $E_k$, and denote the number of active edges in $E_k$ by $a_k$. Then $a_{k+1} \equiv 2^{r_{k+1}} a_k$ (define $a_0 \equiv 1$). Thus by induction, if $$a_k = 2^{\sum_{j=1}^{k} r_j},$$

then $$a_{k+1} = 2^{\sum_{j=1}^{k+1} r_j},$$

and if k=1, then $a_k=2^{r_1}$, so indeed $a_k=$ $$2^{\sum_{j=1}^{k} r_j}$$

Summing over layers, provides the total number of active edges up to and including layer k is $$\sum_{i=1}^{k} 2^{\sum_{j=1}^{i} r_j}.$$

Given the lemma, compute N(z) for each of the d cyclic trees, and choose that tree for which N(z) is minimized. The approach described above has at least two main advantages. First, the worst-case computational cost is selected by the user, who can trade the memory, speed and network bandwidth required, by setting the size of the trees used and the amount of back-tracking that they are willing to tolerate. Second, large changes in just a few components of the original feature vectors can be compensated by first taking projections along random directions.

Figure 6:
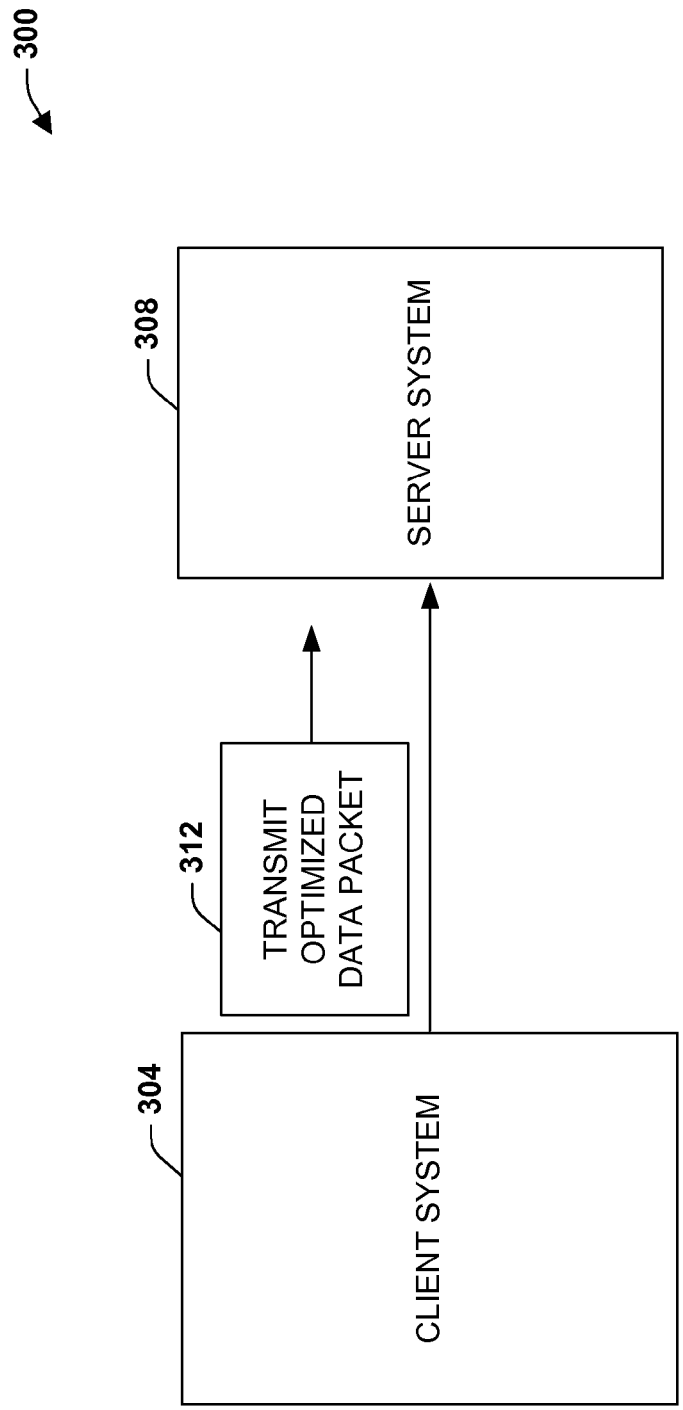
FIG. 6 is a diagram illustrating a computational load balancing process in accordance with an aspect of the present invention.

FIG. 6 is a diagram illustrating a computational load balancing process 300 in accordance with an aspect of the present invention. Some applications may require that fingerprinting (e.g., process of matching audio sample to database component) or lookup is run on a client machine 304, and that the client polls a server 308 to determine a match. In this scenario, anything that can be done to reduce the computational load on the server, which is also acceptable to the user of the client 304, should be done. Thus, the tree lookup could be put on the client 304, but using trees of depth less than d, wherein each leaf node L now contains all the objects at all the leaf nodes of the original tree that can be reached from L in the original tree. The actual lookup could then be performed as follows: If a piece of audio (or other data) generates a path in the tree that reaches a leaf node, then the index of the tree that was used, and the index in that tree of the leaf that was reached, together with the original vector x, can be sent to the server in the form of an optimized packet 312. The server 308 then performs a local lookup employing a fast lookup method (such as R*-trees or SR-trees), wherein the particular SR-tree that is employed corresponds to the node that was located on the client 304. In this manner, the information that is sent from client 304 to server 308 is kept small (e.g., two indices and the vector x), —but not losing accuracy. In the rare cases where x is in the database, but at a different leaf in the tree (i.e., the leaf found was incorrect due to the noise in the signal), the server can simply check x against the entire database. It is noted that in this scenario, the client 304 may have to be updated with new trees as new audio (or other data) clips appear (however this can be done incrementally, mitigating the amount of information needing to flow from server to client).

Figure 7:
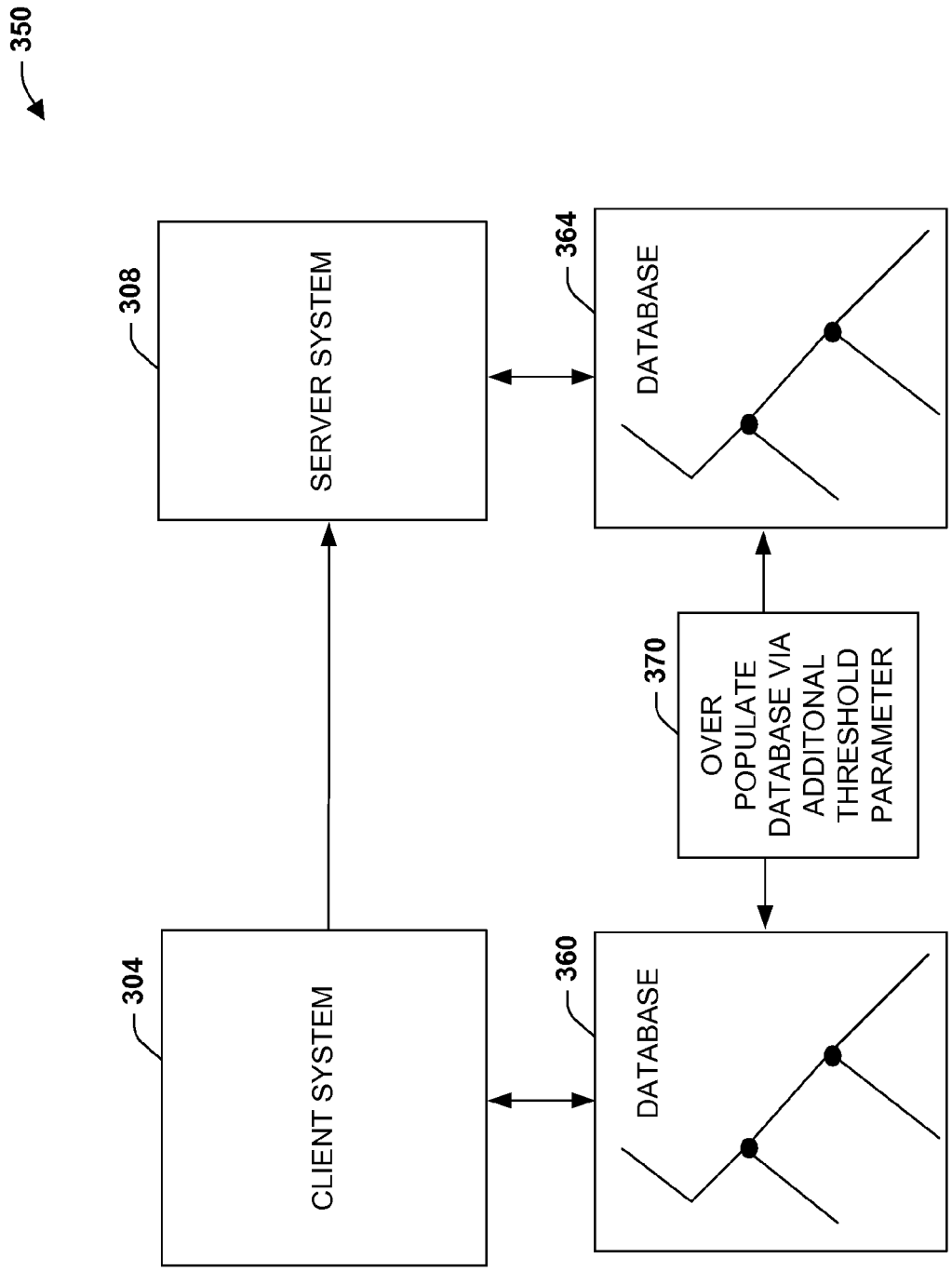
FIG. 7 is a diagram illustrating a database construction process in accordance with an aspect of the present invention.

FIG. 7 is a diagram illustrating a database construction process 350 in accordance with an aspect of the present invention. The systems and processes described above have generally addressed a lookup phase. The following process 350 describes database construction techniques that facilitate robustness to noise. Vectors z that are binarized and inserted into the database at 360 and/or 364 may also have some components that are close to zero. In fact, some vectors may be inherently 'reliable' (have few close-to-zero components), whereas others will be less so. More robustness can be added to unreliable training data in several ways. In one aspect, if only one fingerprint for a given audio clip is needed (or other type data), and if it does not matter from where in the clip the fingerprint is extracted, then select that fingerprint that is most reliable (e.g., whose minimum absolute component value is maximized). In another aspect, using a method that is well known in the art, overpopulate the database 360, 364, as follows at 370: For simplicity, assume that the database contains a single tree (although the actual database may have d trees). Select a fourth threshold, $t_4$. Label the clips in the database $c_i$, i=1, ..., m and let the corresponding fingerprint vectors be $z(c_i)$ with components $z(c_i)j$, j=1, ..., d. For a given $c_i$, if $z(c_i)j<t_4$, then evaluate the tree for values—{0, 1}—at the corresponding node, and place the object $c_i$ at both end leaves. Perform this for every $c_i$ and every component of z that falls below $t_4$. Furthermore, select $t_4$ itself so that the average amount of duplication Δ in the database is acceptable (for example Δ=8 leaves, on average, per clip). It is noted that selecting Δ to be too large may have negative consequences: The database may get too large, and the number of 'hits' during test phase before final lookup may get too large to be acceptable. However the user can utilize Δ to trade off size of the database versus robustness to noise.

Figure 8:
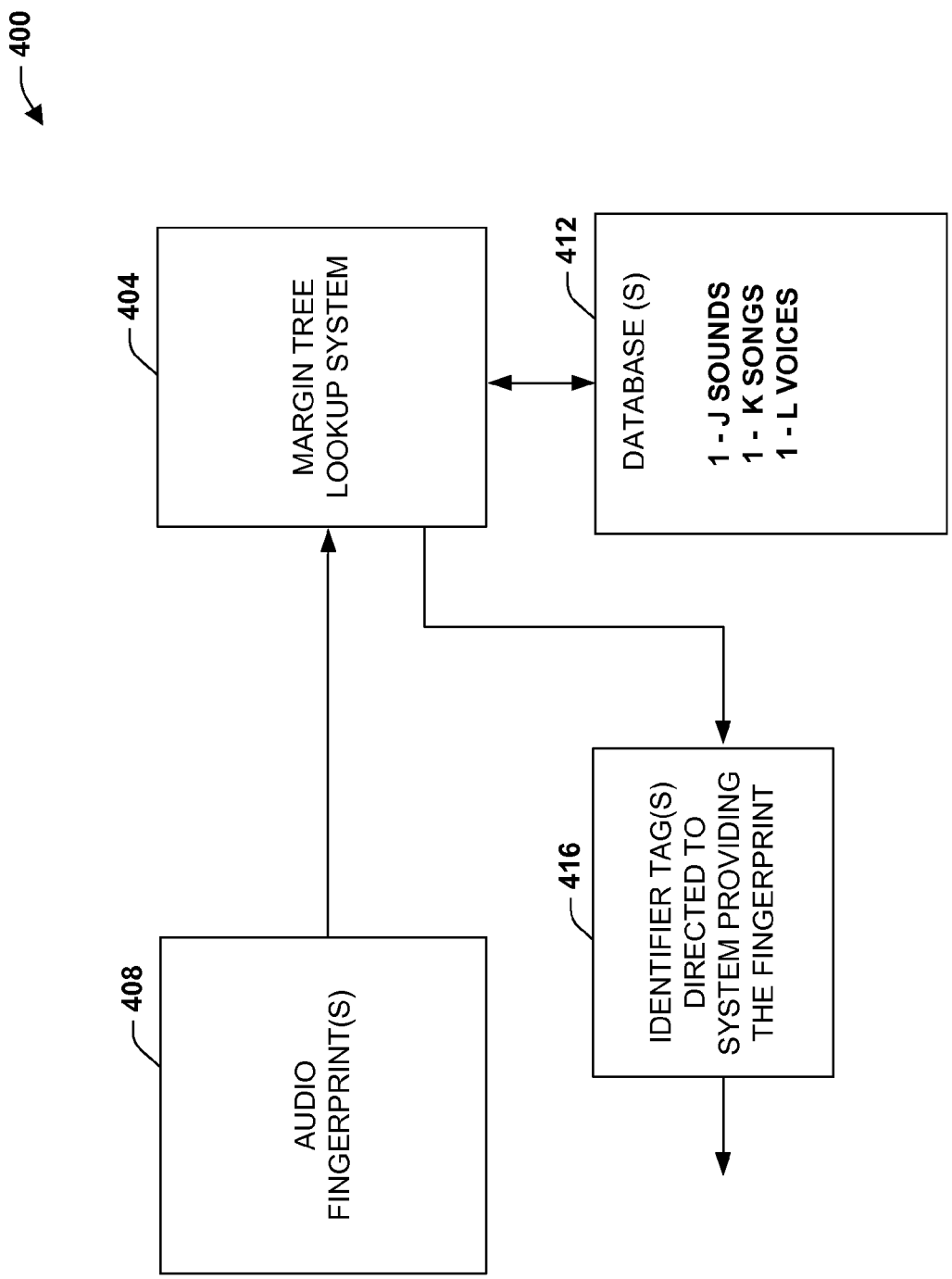
FIG. 8 is a diagram illustrating an audio identification application in accordance with an aspect of the present invention.

FIG. 8 is a diagram illustrating an audio identification application 400 in accordance with an aspect of the present invention. A margin tree lookup (MTL) system 404 includes one or more of the systems and processes described above to perform automated lookups in accordance with the present invention. An audio fingerprint 408 representing a vector audio sample or clip of vectors is passed to the MTL system 404, wherein the system performs a lookup in one or more databases 412 to determine if a match exists or is related in some manner to the audio fingerprint 408. The database 412, can include a plurality of different audio types such as 1 to J sounds, 1 to K songs and 1 to L voices, for example, J, K, L being integers respectively. If a match is determined for the fingerprint 408 in the database 412, the MTL system 404 returns one or more identifier tags at 416 to the system that provided the fingerprint. In one example, a song audio clip may be captured via a telephone or other input device, and transmitted to the MTL system 404. If a match is determined for the fingerprint 408, the MTL system returns the name or identity of the song that was captured in the fingerprint via the identifier tag 416. In another example, a voice audio clip 408 may be captured and transmitted to the MTL system 404. If a match is determined for the voice fingerprint 408, the MTL system returns the name or identity of the person that was captured in the fingerprint via the identifier tag 416 (e.g., based on a clip of Winston Churchill's voice, identifier tag names Winston Churchill as speaker, provided that clip is in the database). It is to be appreciated that sound processing can be performed similarly, wherein natural and/or artificially produced sounds can be identified (e.g., name of cartoon, identification of an animal). It is also be appreciated that exact matches to items in the database 412 may not be required (e.g., an acceptable hit in the database may be a different recording of the same piece of music).

Figure 9:
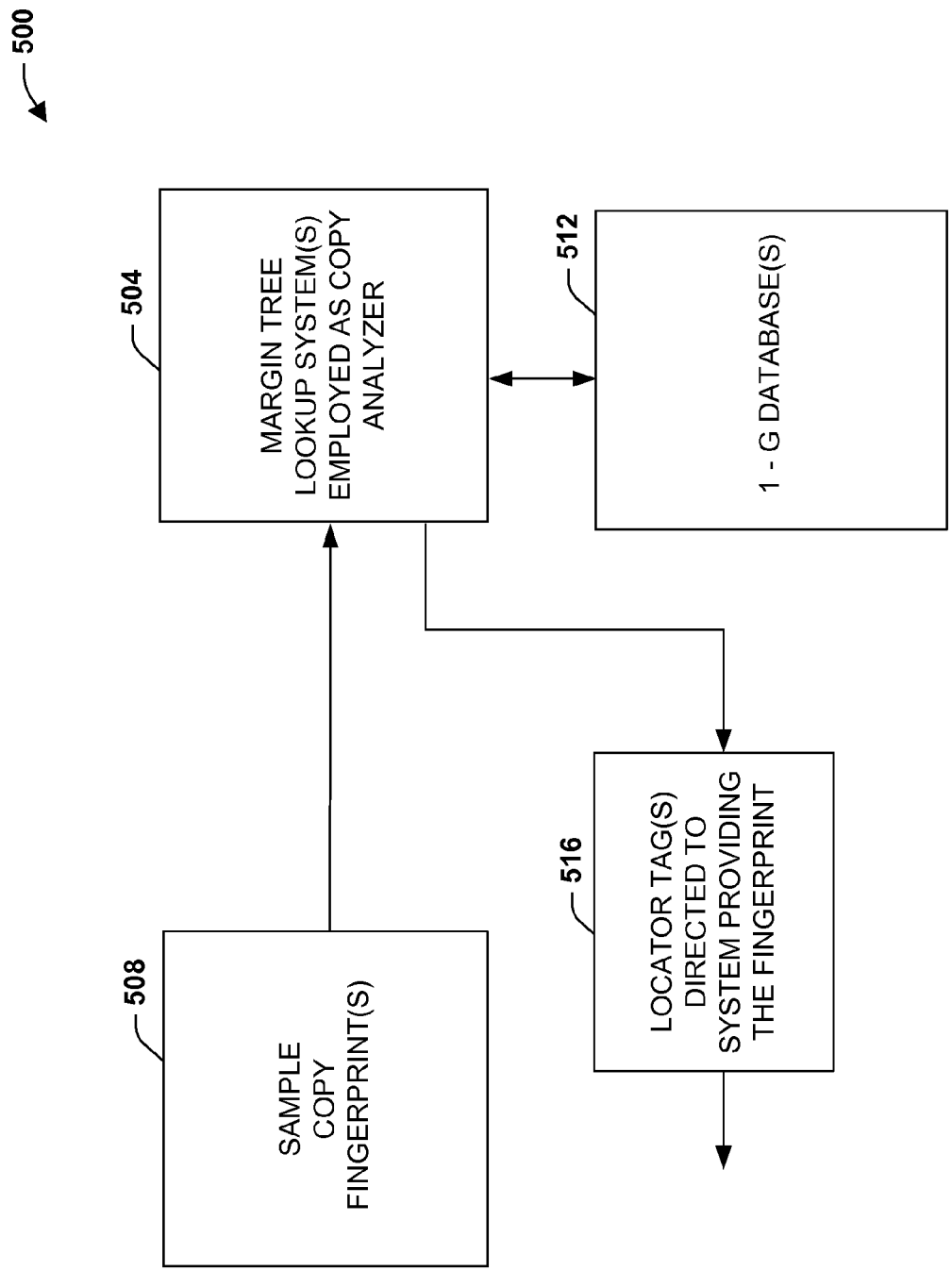
FIG. 9 is a diagram illustrating a copy analyzer application in accordance with an aspect of the present invention.

FIG. 9 is a diagram illustrating a copy analyzer application 500 in accordance with an aspect of the present invention. A margin tree lookup (MTL) system 504 includes one or more of the systems and processes described above to perform automated lookups in accordance with the present invention, and can be employed as a copyright or copy analyzer. A sample copy fingerprint 508 representing a vector audio (or other type) sample or clip of vectors is passed to the MTL system 504, wherein the system performs a lookup in one or more databases 512 to determine if a match exists or is related in some manner to the sample copy fingerprint 508. In this aspect of the present invention, the sample copy is passed to a plurality of different databases or sites to determine if potentially, a database is utilizing unlicensed content at the respective site. If a match is determined for the sample copy fingerprint 508 in any of the databases 512, the MTL system 504 returns one or more locator tags at 516 to the system that provided the fingerprint (e.g., return URL of system or system improperly utilizing unauthorized material). For example, if a rock band such as Metallica suspected that some of their music was being unlawfully pirated or traded, the MTL system 504 can be adapted to poll and sample a plurality of servers and associated databases to determine if an audio clip or clips to any of the band's portfolio resides therein, then return a pointer or address identifying the potentially offending site via the locator tag 516. However it should be appreciated that, while this form of copyright infringement detection may be useful in a large number of cases, it is relatively easy to circumvent it, for example by permuting the samples in the audio prior to saving it on disk, and publishing the permutation used so that users can recover the original audio.

Figure 10:
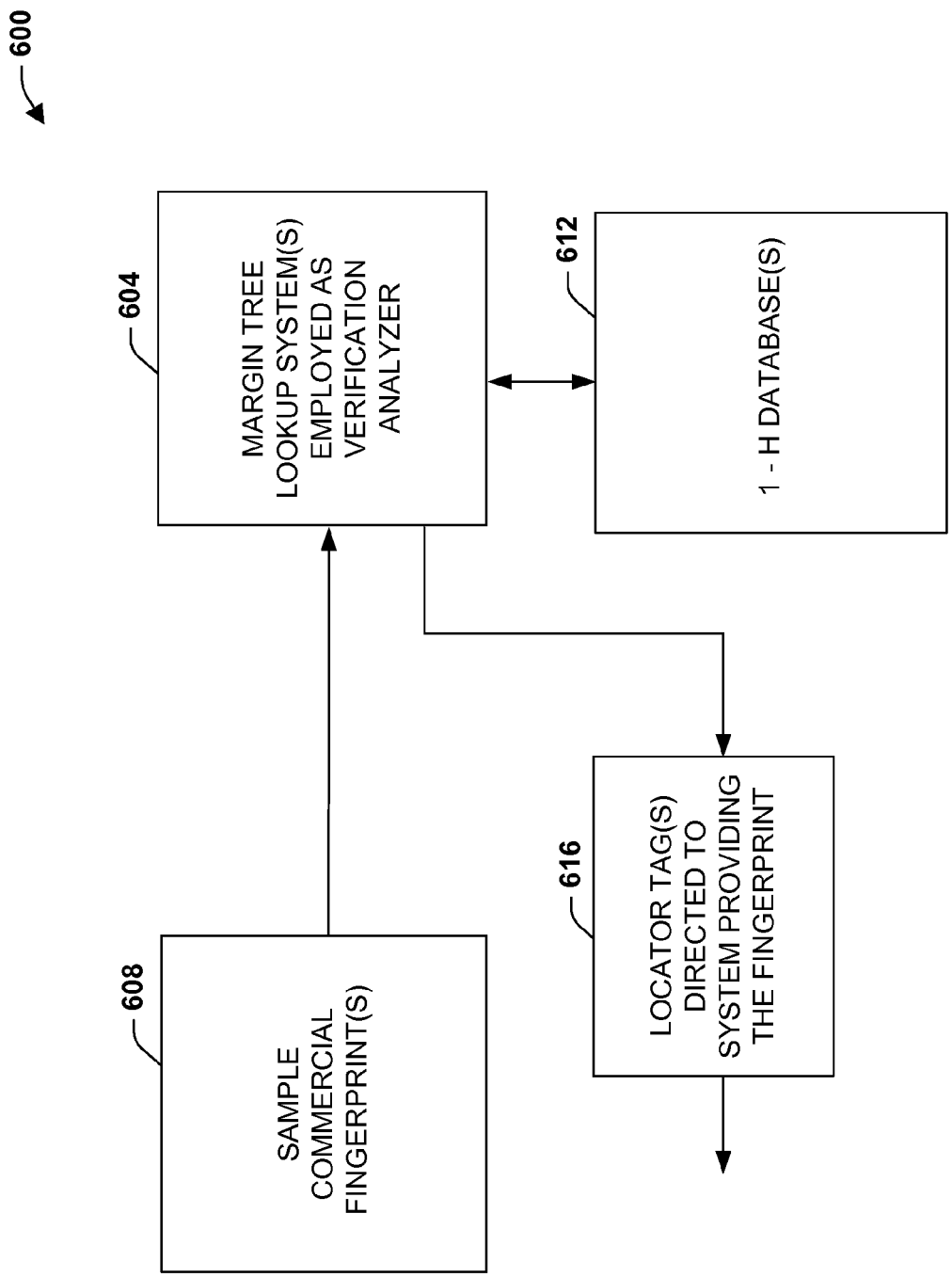
FIG. 10 is a diagram illustrating a verification application in accordance with an aspect of the present invention.

FIG. 10 is a diagram illustrating a verification application 600 in accordance with an aspect of the present invention. A margin tree lookup (MTL) system 604 includes one or more of the systems and processes described above to perform automated lookups in accordance with the present invention, and can be employed as a verification analyzer. A sample commercial fingerprint 608 representing a vector audio (or other type) sample or clip of vectors is passed to the MTL system 604, wherein the system performs a lookup in one or more databases 612 to determine if a match exists or is related in some manner to the sample commercial fingerprint 608, and if so the MTL system 604 returns one or more locator tags at 616 to the system that provided the fingerprint. In this aspect of the present invention, a user or customer may have purchased broadcast and/or web time in order to place a plurality of commercials (or other activity) at various locations and/or sites. It is likely impractical for the user to verify that paid broadcast time has actually been delivered to intended consumers or markets. Thus, the sample commercial fingerprint 608 is passed to a plurality of different databases or sites to verify if potentially, the intended content has actually been provided in the market and at the time agreed to.

Figure 11:
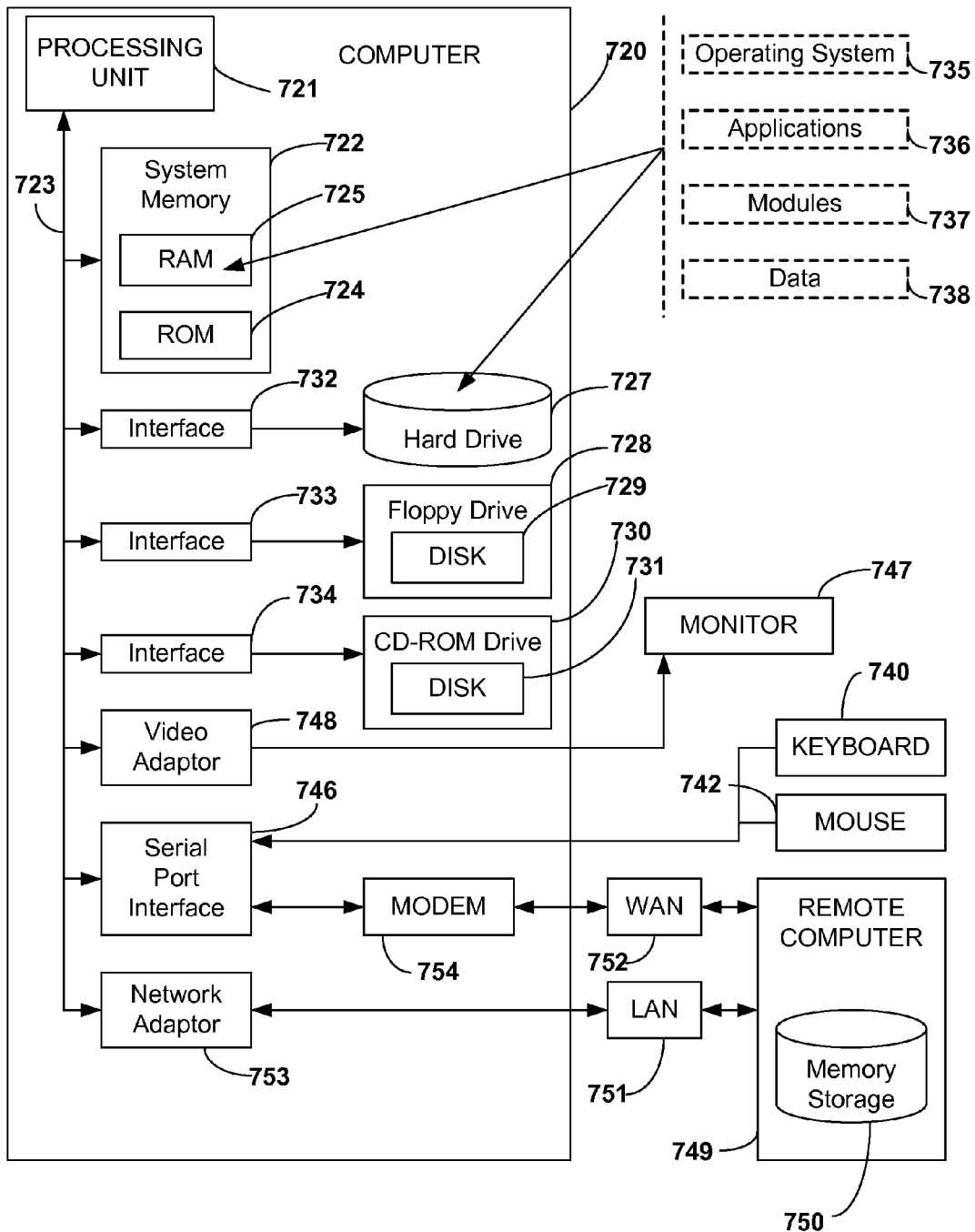
FIG. 11 is a schematic block diagram illustrating a suitable operating environment in accordance with an aspect of the present invention.

In order to provide a context for the various aspects of the invention, FIG. 11 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721. The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system. A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 11. The logical connections depicted in FIG. 11 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer related database lookup system embodied on a computer-readable storage medium, comprising:

a quantizer that forms a quantized vector having M components, M being an integer, the M components of the quantized vector having at least one of three values (0, 1, and q), wherein the quantizer assigns a value q to at least one of the M components;

a threshold function $T(x)$ processing the quantized vector to control at least one of a backtrack, lookup accuracy, lookup load balancing between systems, or noise margins;

a component that performs the lookup in a database in accordance with the values, where q directs the component to perform the backtrack during the lookup, when encountered; and one or more controls to adjust the threshold function $T(x)$.

2. The computer related system of claim 1, further comprising a vector generator that computes the quantized vector from a second vector that is derived from at least one data source.

3. The computer related system of claim 2, wherein the second vector includes N components, N being an integer, comprising at least one of a floating point value and an integer value, and wherein further the floating point value and the integer values are stored in an array.

4. The computer related system of claim 1, further comprising an orthonormal direction generator to compute a third vector that is employed in the lookup.

5. The computer related system of claim 1, further comprising a binary tree generator to map all quantized vectors into a binary tree, for those vectors that occur in the database.

6. A computer related database lookup system embodied on a computer-readable storage medium, comprising:

a quantizer that forms a quantized vector having M components, M being an integer, the M components of the quantized vector having at least one of three values (0, 1, and q), wherein the quantizer assigns a value q to at least one of the M components;

a threshold function T(x) processing the quantized vector to control at least one of a backtrack, lookup accuracy, lookup load balancing between systems, or noise margins; a component that performs a lookup in a database in accordance with the values, where q directs the component to perform a backtrack during the lookup, when encountered;

at least one of a local system or a remote system having associated databases processed in accordance with a lookup tree;

the quantized vector employed to navigate through the lookup tree to determine if a test vector that is derived from the quantized vector matches portions of the database; and one or more user inputs to facilitate user adjustments of the threshold function T(x).

7. The computer related system of claim 6, wherein the local system directs an optimized request via a network to facilitate searching in a database associated with the remote system, wherein further the optimized request including at least one index and a vector.

8. A computer related database lookup method, comprising:

receiving a test vector x having d components;

creating a quantized vector $\hat{x}$ based on the test vector x that maps at least one of the d components to each of three values respectively indicating performing a left side traversal of a database, a right side traversal of the database, or a backtrack operation on the database;

looking up data in the database via the quantized vector $\hat{X}$;

determining the quantized values by testing the d components against threshold parameters $t_2$ and $-t_2$ to determine quantized values, the threshold parameters relating to a threshold function T(x); and configuring threshold parameters $t_1$ and $t_3$ to control backtracking complexity, determining a maximum of n backtrack symbols q for a given test point x, and analyzing if the number of components $x_i$ for which $-t_1 < x_i \leq t_1$ is greater than or equal to n, then rejecting that point.

9. The computer related method of claim 8, further comprising rescaling and shifting the components of x so that each component has zero mean and unit variance in a representative dataset.

10. The computer related method of claim 8, further comprising testing a selected d-component as $x_i$ in accordance with the threshold function T(x), determining $x_i \geq t_2$ then setting $T(x_i)=1$;
determining $x_i < -t_2$ then setting $T(x_i)=0$, and
determining if $-t_2 \leq x_i < t_2$ then setting $T(x_i)=q$.

11. The computer related method of claim 8, further comprising:

determining a value for $t_2$ such that $t_1 < t_2 < t_3$ and such that, for n values of i, $-t_2 \leq x_i \leq t_2$ is established; and mapping $x_1$ to q in order that n locations in the test vector require backtracking.

12. The computer related method of claim 11, further comprising: setting $t_2=t_3$ if no n values exist which satisfy $-t_2 \leq x_i \leq t_2$;

computing whether d<n components satisfy $-t_2 \leq x_i \leq t_2$; and setting selected components to q in order to flag that the selected components require backtracking.

13. The computer related method of claim 8, further comprising:

defining a set of N random orthonormal direction vectors $s_j$; and generating a feature vector at whose j'th component is a dot product of x with $s_j$ in order to mitigate noise generating large shifts in individual components of the vector x.

* * * * *